United States Patent [19]

Wilbrod

[11] Patent Number: 5,946,300

[45] Date of Patent: Aug. 31, 1999

[54] DEVICE FOR TRANSFERRING INFORMATION BETWEEN TWO DIGITAL SIGNAL GENERATORS

[75] Inventor: Jean-Hubert Michel Wilbrod, St Maur Des Fosses, France

[73] Assignee: Optran Technologies, Creteil, France

[21] Appl. No.: 08/645,834

[22] Filed: May 14, 1996

[30] Foreign Application Priority Data

May 18, 1995 [FR] France .................................. 95 05935

[51] Int. Cl.⁶ ...................................................... H04L 1/00
[52] U.S. Cl. .......................... 370/241; 370/509; 370/516; 370/538; 370/907
[58] Field of Search ..................................... 370/503, 505, 370/506, 509, 516, 517, 537, 538, 539, 907, 422, 222, 223, 241, 242, 243, 252

[56] References Cited

U.S. PATENT DOCUMENTS 5,278,824  1/1994  Kremer ..................................... 370/223
5,754,528  5/1998  Uchida ..................................... 370/222

*Primary Examiner*—Chi H. Pham
*Assistant Examiner*—Maikhanh Tran
*Attorney, Agent, or Firm*—Young & Thompson

[57] ABSTRACT

This device for transferring information between two digital signals includes means (26, 44; 62, 86) of selecting characteristics of a digital input signal, means (28, 46; 78, 94) of direct transmission to a digital output signal and means (28, 46; 80; 114) for the positioning within the latter, of elements of the input signal conveying first characteristics authorized, by the means of selection, to be transferred directly to the output signal, means (30, 32, 48, 50; 72, 74, 90, 92, 98) of measuring second characteristics of the input signal which are identified by the selection means, and means (78, 80, 102, 110) of modifying the output signal on the basis of the measurement values of the second characteristics so that the said second characteristics of the output signal and the input signal are identical.

11 Claims, 5 Drawing Sheets

DEVICE FOR TRANSFERRING INFORMATION BETWEEN TWO DIGITAL SIGNAL GENERATORS

BACKGROUND OF THE INVENTION

The present invention relates to a device for transferring information between two digital signals and relates in particular to a generator of high bit rate digital data signals from low bit rate digital data signals and to a generator of low bit rate digital data signals from high bit rate digital data signals incorporating such a data transfer device.

The invention relates in particular to a generator of high bit rate digital data signals from low bit rate digital data signals and to a generator of low bit rate digital data signals from high bit rate digital data signals making it possible to measure very high bit rate digital data transmission paths.

A very high bit rate digital data transmission path is measured by transmitting a high bit rate digital data signal down the path, each data item of which can be modified, for example the timing of the signal, the alarms, the errors . . . and by subsequently analysing each of these characteristics simultaneously.

DESCRIPTION OF THE RELATED ART

The current devices for sending high bit rate digital data signals generate the timing of the high bit rate signal, then use this timing to produce the binary content of the high bit rate digital data signal while incorporating therein data stemming from a digital input signal conveying low bit rate data. Downstream, error injection or alarm functions enable a user to perturb the signal sent.

Furthermore, the known generators of low bit rate digital data signals which provide for the reception of high bit rate digital data signals detect each of the characteristics pertaining to the high bit rate data signal, for example signal loss, frame loss, frame synchronization output, . . . , and transmit these characteristics to a processing system with a view to their detection and recording.

In these known devices, all the characteristics, and in particular the error, alarm and frequency characteristics of the high bit rate digital data signal are not transmitted in full to the low bit rate digital data signal.

Furthermore, these devices do not provide for conversion between a low bit rate digital data signal and a high bit rate digital data signal, they do not allow measurement of very high bit rate digital data transmission paths on the basis of a low bit rate digital data signal delivered by a low bit rate digital data signal generator, a very wide variety of which exists on the market.

SUMMARY OF THE INVENTION

The purpose of the invention is to alleviate these drawbacks.

Its subject is therefore a device for transferring information between two digital signals conveyed by at least one signal transmission module, characterized in that it includes means for selecting characteristics of a digital input signal containing the said information, means of direct transmission to a digital output signal and means for the positioning within the latter of elements of the input signal conveying first characteristics authorized, by the selection means, to be transferred directly to the output signal so that a variation in the said first characteristics of the said input signal gives rise to an identical variation in the first characteristics of the said output signal, means of measuring second characteristics of the input signal which are identified by the means of selection, and output signal modification means connected to the measuring means and adapted so as to modify the output signal on the basis of the values of the second characteristics supplied by the said measuring means so that the said second characteristics of the output signal and of the input signal are identical.

The transfer device according to the invention can furthermore include one or more of the following characteristics:

the digital input signal is a framed signal and the device furthermore includes means for extracting the timing of the input signal, the said means of selection comprising a set of counters synchronized to the said input signal and adapted so as to effect a division of the said timing with a view to obtaining a frame of the said input signal, and decoding means adapted so as to effect detection of the data of the said frame;

the means of direct transmission comprise means for sampling the said elements of the input signal containing the said first characteristics authorized by the said means of selection to be transferred directly to the output signal;

the first means of positioning and the modification means include means of multiplexing elements of the input signal with the output signal, which are fed with the said input signal and with the signals originating from the said selection means;

the means of measuring the second characteristics of the input signal include means of calculating the said second characteristics on the basis of elements of the input signal originating from the selection means;

the selection means, the means of direct transmission, the modification means and the positioning means each consist of circuits with logic components.

Another subject of the invention is a generator of high bit rate digital data signals from low bit rate digital data signals, characterized in that it includes an information transfer device such as defined above, and in that it includes frequency multiplication means connected to the timing extraction means and to the modification means, with a view to producing, from a signal delivered by the timing extraction means, a clock signal for the high bit rate digital data signal.

Advantageously, it furthermore includes data storage means connected to the means of direct transmission and data selection means with a view to effecting the selective transfer, to the high bit rate digital data signal, of data of the low bit rate digital data signal and of the said data stored in the storage means.

Preferably, the second characteristics of the low bit rate digital data signal consist of data comprising an error in a frame alignment word and/or an error in an error monitoring word of a regenerated elementary section of the low bit rate signal.

Another subject of the invention is a generator of low bit rate digital data signals from high bit rate digital data signals, characterized in that it includes an information transfer device such as defined above, and in that it includes frequency division means connected to the timing extraction means and to the modification means with a view to producing, from the signal delivered by the said timing extraction means, a clock signal for a low bit rate digital data signal.

Advantageously, the second characteristics of the high bit rate digital data signal consist of data comprising an error in a frame alignment word, an error in an error monitoring word of a regenerated elementary section and/or an error in an error monitoring word of a multiplex section of the high bit rate digital data signal.

BRIEF DESCRIPTION OF THE DRAWINGS

Other characteristics and advantages will emerge from the following description given by way of example in connection with the appended drawings in which.

DESCRIPTION OF THE PREFERRED EMBODIMENTS

Figure 1:
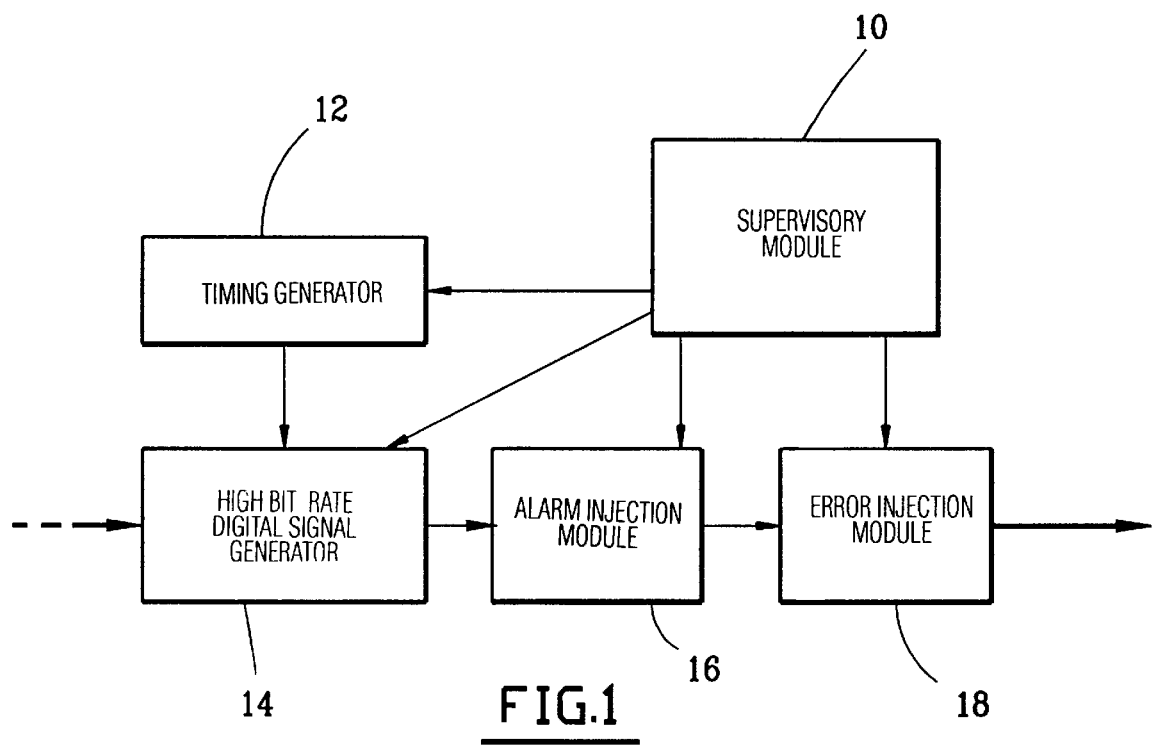
FIG. 1 represents a schematic diagram of a high bit rate digital data signal generator of a high bit rate digital transmission path measuring apparatus according to the prior art.
Figure 2:
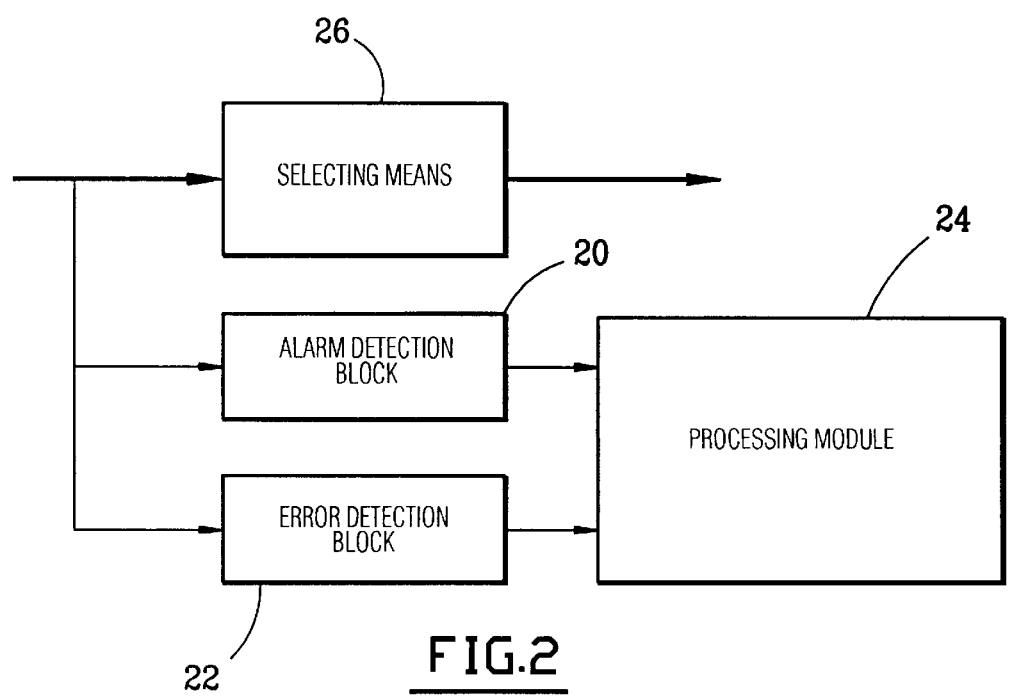
FIG. 2 represents a schematic diagram of a high bit rate digital data signal receiver of a high bit rate digital transmission path measuring apparatus according to the prior art.

Referring to FIGS. 1 and 2, a high bit rate digital transmission path measuring apparatus includes a high bit rate digital signal generator, diagrammatically represented in FIG. 1, and a high bit rate digital data signal receiver, diagrammatically represented in FIG. 2.

The high bit rate digital data signal generator includes a supervisory module 10 connected to a timing generator 12, to a high bit rate digital signal generator 14 proper, to an alarm injection module 16 and to an error injection module 18.

The supervisory module 10 provides the man/machine interface.

The timing generator 12 produces, from settings supplied by an operator, the timing of the high bit rate digital data signal to be transmitted in the digital transmission path. The high bit rate digital signal generator uses the timing produced by the timing generator 12 to generate the binary content of the high bit rate digital signal to which may be appended data stemming from an incoming digital signal, represented dashed in this figure.

The signal delivered by the high bit rate digital signal generator 14 is next presented successively as input to the alarm injection module 16 and to the error injection module 18 so as to modify each of the characteristics of the high bit rate digital signal produced.

The digital signal thus delivered is next transmitted in the digital transmission path and then analysed at the output by the high bit rate digital data signal receiver represented in FIG. 2.

The high bit rate digital data signal receiver includes a block for detecting alarms 20 pertaining to the high bit rate digital signal, such as signal loss, frame loss, frame synchronization output . . . , and an error detection block 22 calculating for example the parity of the incoming signal. The alarm and error signals are next transmitted to a processing module 24 with a view to their counting and display.

Furthermore, the receiver includes a module for extracting a low bit rate tributary 26 providing a valid signal irrespective of the high bit rate signal by sending for example an alarm indication signal if the high bit rate signal exhibits frame loss.

As mentioned earlier, the high bit rate digital data signal generators and the high bit rate digital data signal receivers known to date cannot provide for complete transfer of the characteristics between high bit rate and low bit rate digital data signals.

In order to alleviate these drawbacks, and according to the invention, there is associated internally or externally with a digital transmission path measuring apparatus, a device for transferring information between two digital signals conveyed by at least one signal transmission module effecting a transfer of the characteristics of an incoming signal to an output signal according to various modes of transfer, so as to effect corruption-free transfer of all the characteristics required to be modified or measured.

The term "characteristics" is intended to mean a data set, in particular a set of bytes of the relevant signal which are associated with a particular function such as the alarm, error function, . . .

The transfer device furthermore includes a function providing for a bit rate conversion allowing the use of a low bit rate measuring apparatus for the measurement of high bit rate digital transmission paths.

Thus, a measuring apparatus operating at low bit rate associated with such a transfer device can be used to measure high bit rate transmission paths, measurement of characteristics of the outgoing signal henceforth providing the same result as measurement of these same characteristics on the incoming signal.

A device for transferring information between a high bit rate digital data signal and a low bit rate digital data signal, conveyed respectively by a digital path known under the designation STM16 operating at around 2488 megabits per second and an STM1 path operating at around 155 megabits per second will now be described with reference to FIGS. 3 to 8.

A signal conveyed by an STM type digital path is a framed signal, its frame transmitting the following characteristics:

AIS: Alarm indication signal (SIA)
APS: Automatic switchover to reserve link
AU: Administrative unit
AUG: Administrative unit group
AU-Path AIS: SIA of the administrative unit route
BER: Binary error rate
BIP-n: Parity of interleaving of bits-n
Ci: Concatenation indication
C-m: Container-m
DCC: Data communication channel
EBER: Excessive error rate
ECC: Integrated communication channel
EFD: Impaired operating state
EFI: Unacceptable operating state
EFN: Normal operating state
FEBE: Far-end block error
FERF: Far-end reception fault
HOP: Higher order path
HO-Path FERF: Far fault indication for the higher order route path
HPA: Higher order path adaptation
HPC: Higher order path connection
HPT: Higher order path termination IdE: Indication of Environment
IdF: Indication of Failure
LPA: Lower order path adaptation
LOF: Loss of frame
LOP: Loss of pointer
LOS: Loss of signal
MCF: Message communication function
MS-AIS: Multiplex section SIA
MS-FERF: Multiplex section far fault
MSOH: Multiplex section overhead
NDF: New data flag
NOMC: Regroup the bytes E1, E2, F1 and D1–D12
NU: Overhead byte for national use
OFS: Second with frame loss
OOF: Frame desynchronization
PJC: Number of pointer justifications
PJE: Pointer justification event
POH: Path overhead
PSC: Number of switchovers to backup channel
RAI: Remote alarm indication
RD: Impaired reception
RSOH: Regenerator section overhead
SAE: Second with error
SD: Impaired signal
SF: Signal cut
SGE: Seriously Erroneous Second
SOH: Section overhead
TD: Impaired transmission
TF: Faulty transmission
TS: Timing generation
VC-m: Virtual container-m The frame of a signal conveyed by an STM type digital path has a period of 125 microseconds and is composed of a capacity or useful signal obtained by multiplexing several AUGs and an SOH.

Figure 3:
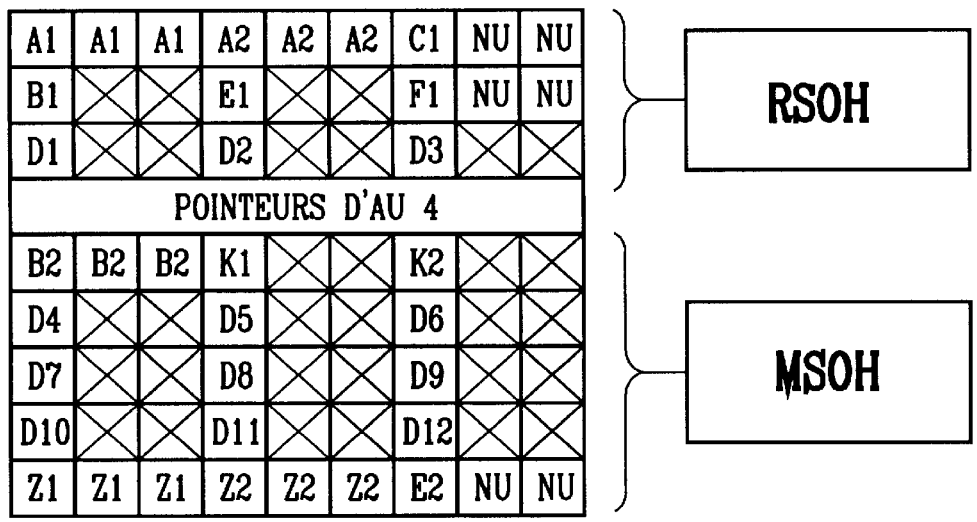
FIG. 3 is a diagram illustrating the structure of the section header of a low bit rate digital data signal.

FIG. 3 shows that the SOH of a low bit rate signal travelling over an STM1 type digital path consists of nine rows of nine columns of bytes, rows 1 to 3 forming the regenerator section overhead (RSOH), row 4 including the pointers of AU4 and rows 5 to 9 forming the multiplex section overhead (MSOH). The RSOH conveys, in particular, bytes A1 and A2 constituting a frame alignment word and a byte B1 constituting a parity error monitoring word of the RSOH of the frame of the low bit rate signal.

Figure 4:
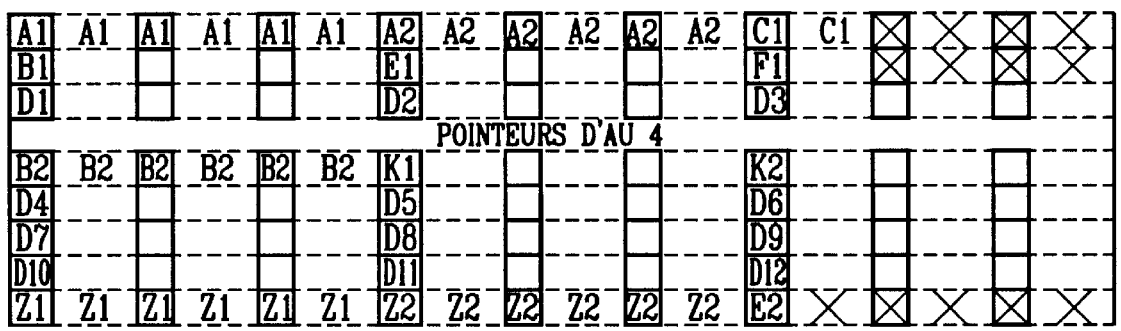
FIG. 4 is a diagram illustrating the structure of the section header of a high bit rate digital data signal.

Referring to FIG. 4, it may be seen that the SOH of a high bit rate signal conveyed by an STM16 type digital path includes nine rows of 144 columns of bytes conveying in particular 48 bytes A1, 48 bytes A2, one byte B1 and 48 bytes B2 constituting a parity error monitoring word of the MSOH calculated over all the bytes of a previous frame, with the exception of the bytes of the RSOH.

In FIGS. 3 and 4 the unused bytes are designated by a cross.

Furthermore, the AUG of a low bit rate signal and the AUG of a high bit rate signal convey bytes B3 and V5 respectively constituting a higher order path error monitoring word and a lower order path error monitoring word.

An information transmission device of a digital path measuring apparatus will now be described with reference to FIGS. 5 and 6.

This device includes a transmit part, consisting of a high bit rate digital signal generator and a receive part, consisting of a low bit rate digital signal generator.

Figure 5:
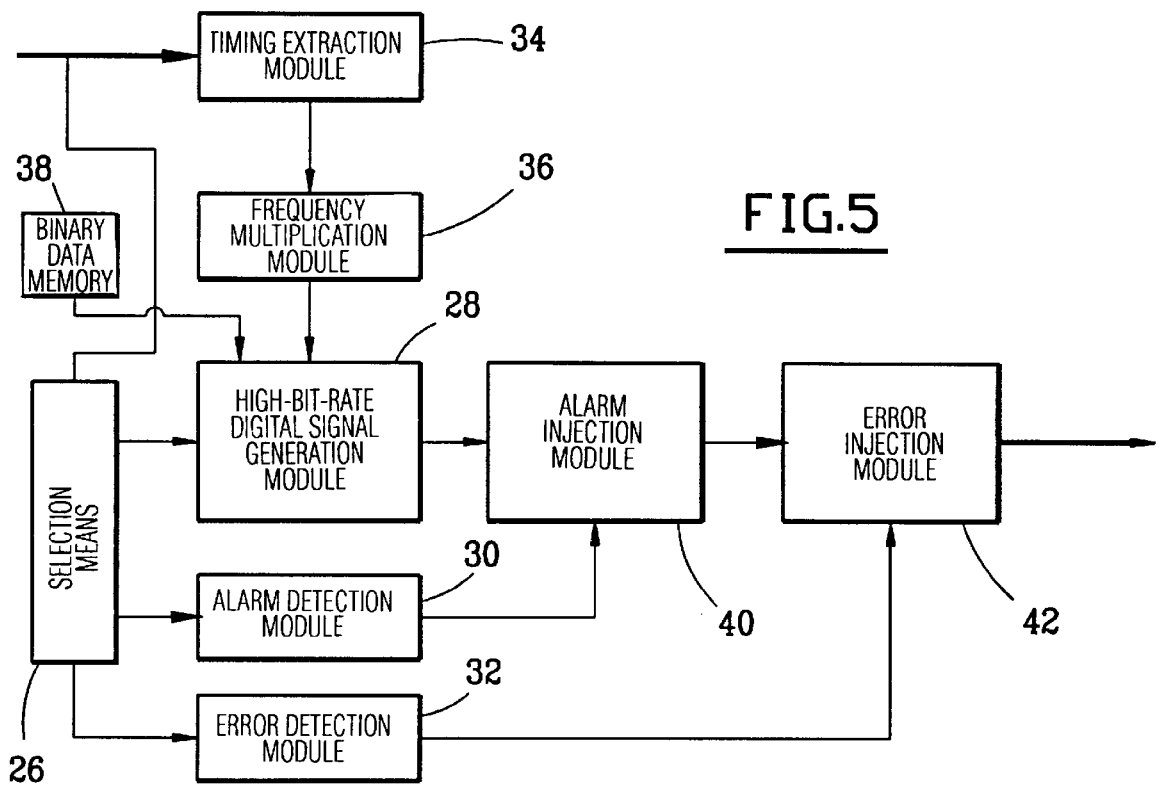
FIG. 5 is a schematic diagram illustrating a high bit rate digital data signal generator according to the invention.

FIG. 5 shows that the high bit rate digital signal generator includes input signal characteristics selection means consisting of means 26 for decoding the data of the low bit rate digital signal present at the input of the generator, feeding a high bit rate digital signal generation module 28, and measuring means including an alarm detection module 30 and an error detection module 32.

Furthermore, the high bit rate digital signal generator includes an input signal timing extraction module 34 connected to a frequency multiplication module 36 delivering to the high bit rate digital signal generation module 28 a periodic electrical signal of frequency equal to the timing of the high bit rate signal, generally designated by the term "High Bit Rate Transmit Clock".

Moreover, the high bit rate digital signal generation module 28 is connected to a binary data memory 38.

Furthermore, the high bit rate digital signal generator 28 includes high bit rate signal modification means comprising an alarm injection module 40 arranged at the output of the high bit rate digital signal generation module 28 and fed by the alarm detection module 30 and an error injection module 42 arranged at the output of the alarm injection module 40 and fed by the error detection module 32.

The selection means 26 consist of a discrimination module effecting a tagging in the input signal of the various data to be processed and draw off from this input signal a first set of bytes and supply them, associated with their sequencing, to the high bit rate digital signal generation module 28 with a view to their direct transfer and positioning in the high bit rate digital output signal so that the characteristics conveyed by this first set of bytes vary in an identical manner in the input signal and in the output signal.

Furthermore, the alarm detection module 30 and the error detection module 32 provide for the measurement of characteristics conveying a second set of bytes, drawn off from the input signal by the discrimination module, and transmit the data resulting from the measurement to the alarm injection module 40 and to the error injection module 42 with a view to their transfer and positioning in the high bit rate digital signal produced by the high bit rate digital signal generation module 28.

In particular, the alarm detection module effects detection of alarms according to the criterion defined in the International Standard designated by the reference ITU followed by the telecommunications standardization sector. The result of this detection is a set of electrical signals each conveying both the presence of an alarm and its duration.

Furthermore, the error detection module 32 detects the occurrence of an error of each type, namely, an error in the parities B1, B2 and M1, and an error in the frame alignment word by detecting errors in the bytes A1 and A2, by simple sampling for the data item M1, by parity calculation and post-sampling comparison of a byte for the data items B1 and B2 and by post-sampling comparison for the data items A1, A2.

The output signal from the error detection module 32 is a set of signals, at the rate of one signal per error type, conveying a pulse or an indication of number as soon as one or more errors is detected.

The alarm injection module 40 then modifies the high bit rate signal produced by the high bit rate digital signal generation module 28 over the duration of activity of the signal delivered by the alarm detection module 30, according to the type of each alarm.

In particular, detection of an LOS type alarm in the incoming signal cuts the sending of the output signal for as long as this alarm persists.

It should be noted that the signal delivered by the alarm injection module 40 is a high bit rate digital signal having the same alarm characteristics as the low bit rate input signal.

Similarly, the error injection module 42 modifies the high bit rate signal delivered by the error injection module 40 at a place which will allow the detection of an error with each error pulse received.

Consequently, the signal delivered by the error injection module 42 constituting the high bit rate digital data signal delivered by the high bit rate digital signal generator, exhibits the same error and alarm characteristics as the low bit rate incoming signal.

As was mentioned earlier, the high bit rate digital signal generation module 28 produces a high bit rate digital signal having a timing which is a multiple of the low bit rate input signal.

This signal is generated from the module 34 for extracting the timing of the incoming signal and from the frequency multiplication module 36. The timing extraction module 34 consists for example of a surface-wave filter delivering a periodic signal the period of which is equal to the period of the input signal or equal to a multiple of this period.

The frequency multiplication module 36 includes a phase lock loop operating on a circuit oscillating at the frequency of the high bit rate signal to be delivered and supplies a periodic electrical signal of frequency equal to the timing of the high bit rate transmit clock, that is to say 2488.320 Mhz.

Thus, the relative deviation characteristic of the frequency is identical in the high bit rate signal and in the low bit rate signal.

Finally, in order to provide for the construction of a full frame, the bytes of the high bit rate digital signal which are not filled by the bytes of the low bit rate digital signal receive binary data stored in the storage means 38 under the control of the discrimination facility 26.

It should be noted that the data present in the low bit rate digital input signal are transferred to the high bit rate digital output signal by homothety, by implicit transfer and by explicit transfer.

Here, the homothety corresponds to multiplication of the frequency of the input signal by 16.

Implicit transfer corresponds to direct transfer of data from the input signal to the output signal. For example, the bytes of the SOH are drawn off from the input signal to form columns 1, 17, 33, 49, 65, 81, 97, 113 and 129 of the SOH of the signal of the STM16, the other bytes of the SOH of the STM16 being filled with the data drawn off from the storage means 38.

Explicit transfer corresponds to measuring characteristics of the input signal and to reinjecting the measurement value into the output signal.

Figure 6:
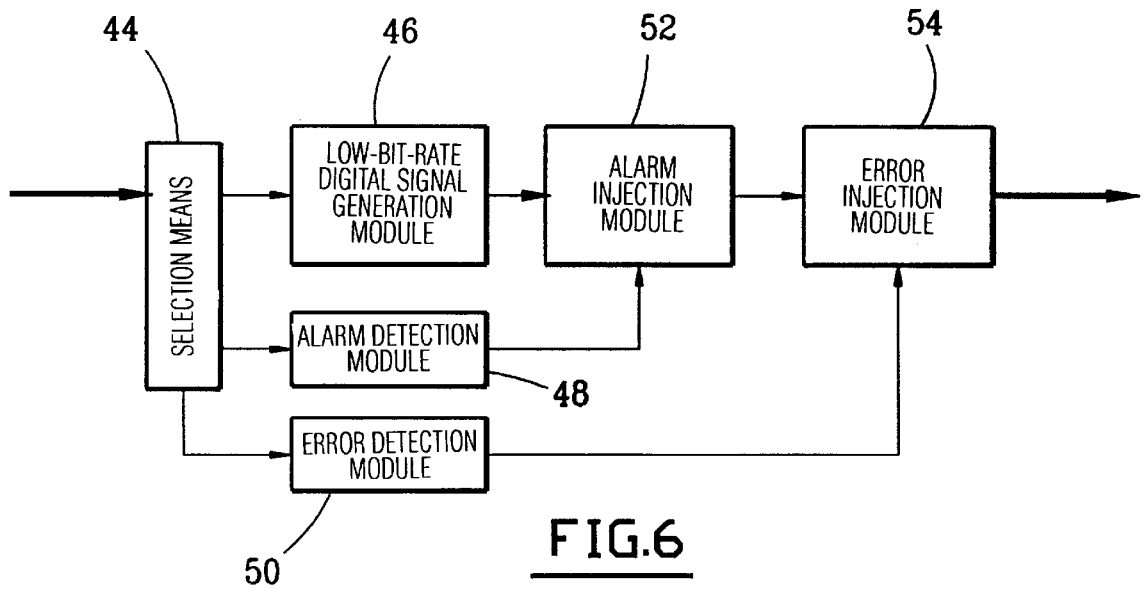
FIG. 6 is a schematic diagram of a low bit rate digital data signal generator according to the invention.

FIG. 6 represents the low bit rate digital signal generator of the device for measuring digital paths.

This generator is intended to produce an STM1 type signal from an STM16 type conveyed signal by transferring all the transmission characteristics from the STM16 to the STM1.

This figure shows that the generator includes means for selecting the characteristics conveyed by the STM16, which characteristics are constructed by means 44 for decoding the data of the input signal, feeding a low bit rate digital signal generation module 46, and measuring means comprising an alarm detection module 48 and an error detection module 50.

The decoding means 44 consist of a discrimination module effecting a tagging in the input signal of the various data to be processed.

The discrimination module 44 draws off from the input signal a first set of bytes and supplies them to the low bit rate digital signal generation module 46 with a view to their implicit transfer to the low bit rate digital output signal by direct transfer and positioning in this digital signal in such a way that the characteristics conveyed by this first set of bytes vary in an identical manner in the input signal and in the output signal.

Furthermore, the discrimination model 44 effects selection of a second set of data of the input signal, consisting of the alarms and errors of this input signal, and supplies them to the alarm detection module 48 and to the error detection module 50 with a view to their explicit transfer into the signal generated by the low bit rate digital signal generation module 46 by modifying the low bit rate digital signal by means of an alarm injection module 52 and of an error injection module 54, which are connected respectively to the alarm detection module 48 and to the error detection module 50.

Thus, all the information relating to the digital input signal and which is conveyed by the STM16 appears within a digital output signal conveyed by an STM1.

The operation of this low bit rate digital signal generator is as follows.

The discriminator 44 draws off from the high bit rate signal the elements which are to be transferred directly, that is to say by implicit transfer, and supplies them to the low bit rate digital signal generation module 46.

These elements are drawn off in an amount which makes it possible to provide an integer ratio of bit rates, but are not necessarily drawn off in a regular manner. It may be beneficial to draw them off while optimizing their implicit transfer.

In particular, the SOH of the output signal will consist of columns 1, 17, 33, 49, 65, 81, 97, 113, 129 of the STM16 and the AU4 of this output signal will consist of the columns of the STM16 which form one of the sixteen AU4s of the input signal.

The low bit rate digital signal generation module 46 forms, from the elements originating from the discrimination module 44, a low bit rate tributary with a timing which is divided according to a specified ratio and the structure of which conforms to the recommendations of the ITU-T. This comprises in particular the recalculation of all the parity bytes which are no longer correct after their transfer.

The alarm detection module 48 detects the occurrence of alarms according to the criterion defined in the standard. This module 48 produces a set of electrical signals each conveying both the presence of an alarm and its duration.

The error detection module 50 detects the occurrence of an error of each of the types, such as an error in the parity M1, in the frame alignment word by detecting errors in bytes A1 and A2 and in the parities B1 and B2, respectively by simple sampling, by parity calculation and post-sampling comparison and by post-sampling comparison.

The result of this processing is a set of signals, one per error type, conveying a pulse or an indication of the number of errors as soon as one or more errors is detected.

The alarm injection module 52 modifies the low bit rate signal delivered by the low bit rate signal generation module 46 for the duration of activity of the control signal delivered by the alarm detection module 48, according to the type of each alarm.

Thus, the detection of an LOS alarm in the incoming signal will cut the sending of the outgoing signal for as long as this alarm persists.

It should be noted that the alarm injection module 52 produces a low bit rate signal having the same alarm characteristics as the high bit rate input signal.

The error injection module 54 modifies the low bit rate signal delivered by the alarm injection module 52 at a location which will allow the detection of an error with each error pulse received.

It should also be noted that this error injection module 54 delivers a low bit rate signal having the same error and alarm characteristics as the high bit rate input signal.

A particular embodiment of an STM16 digital transmission path measuring device will now be described with reference to FIGS. 7 and 8.

Figure 7:
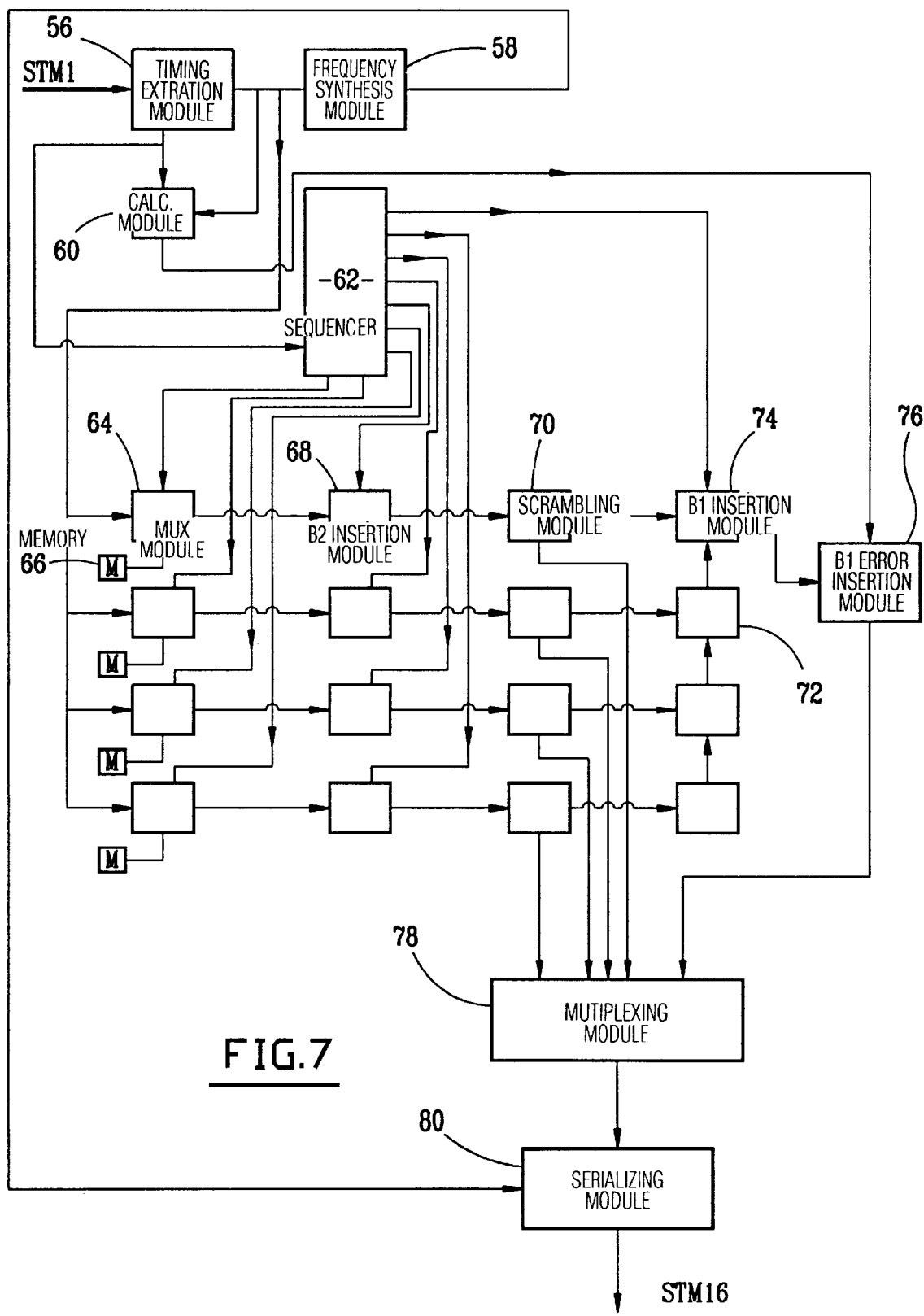
FIG. 7 is a schematic diagram illustrating a particular embodiment of the generator of FIG. 5.
Figure 8:
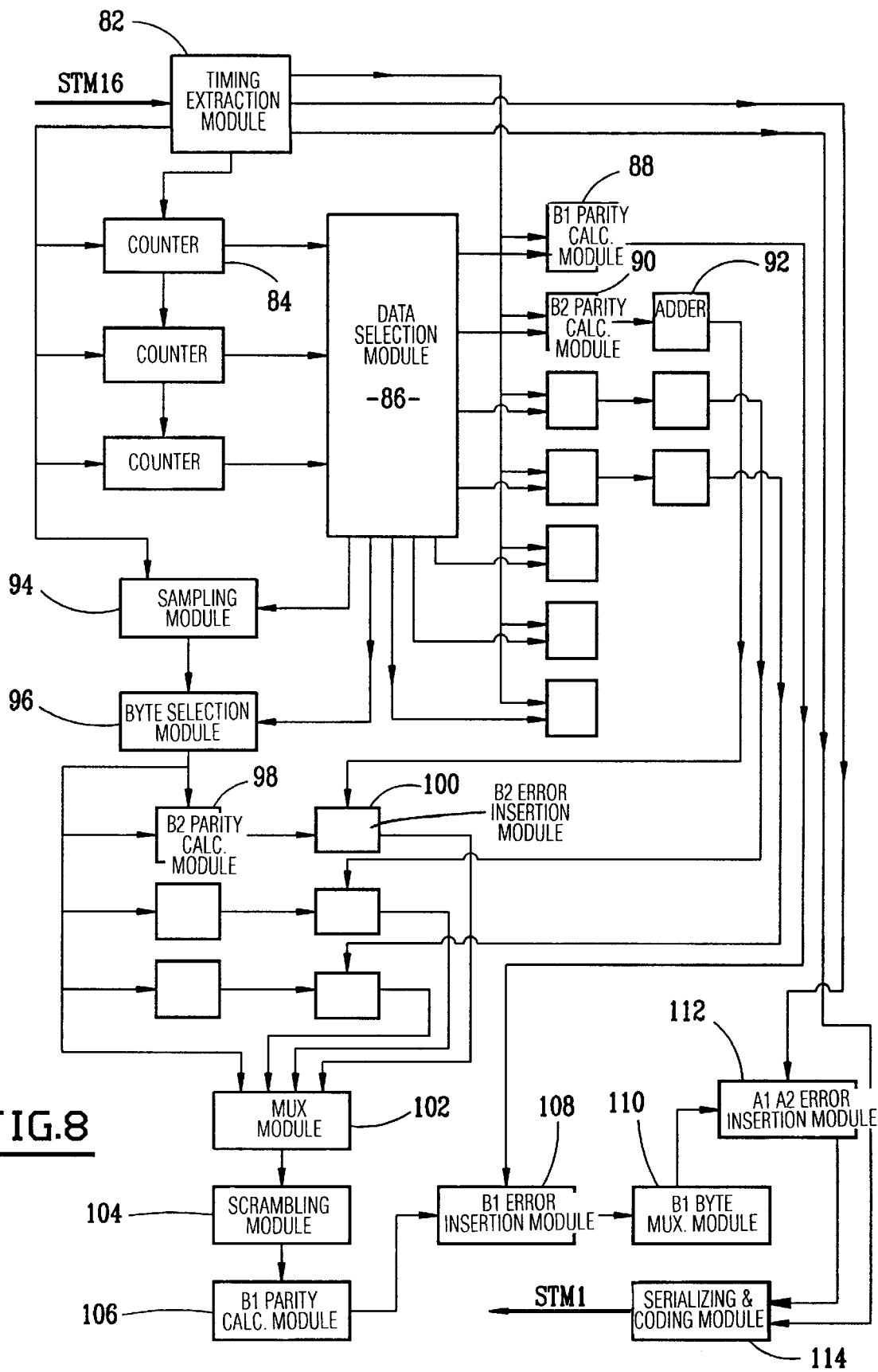
FIG. 8 is a schematic diagram of a particular embodiment of the generator of FIG. 6.

The measuring device includes a transmit part including a high bit rate digital signal generator represented in FIG. 7 and a receive part including a low bit rate digital signal generator represented in FIG. 8.

With reference to FIG. 7, the high bit rate digital signal generator includes a timing extraction module 56 receiving the input signal conveyed by an STM1 and feeding a frequency synthesis module 58 and a calculation module 60.

The timing extraction module 56 effects a CMI type decoding of the input signal, recovery of the timing, detection of the frame alignment word and synchronization of the generator to the input frame by supplying a frame synchronization pulse which feeds the calculation module 60.

The timing extraction module 56 moreover parallelizes, in the form of bytes, the input signal feeding the frequency synthesis module 58 and supplies a clock synchronous with the bytes feeding the calculation module 60.

This module can be embodied as discrete logic components in ECL technology, ECL/CMOS converters, or a timing recovery module, based on a surface-wave filter.

The calculation module 60 effects detection of the errors B1 in the input signal in the form of bytes. This detection is carried out in accordance with recommendation ITU-T-G709. This module delivers an error information item in the form of one or eight signals taking the value "1" over a frame if an error is detected respectively in a corresponding byte or one of the eight bits of the byte.

This block can be embodied as an ASIC, an FPGA, or be integrated into one of these two types of components.

The frequency synthesis module 58 provides for the production of a clock at 2488.320 MHz, in synchronism with the clock stemming from the signal from the STM1. It is embodied with the aid of a VCx0 and of a phase lock loop.

Furthermore, the frame synchronization pulse signal delivered by the timing extraction module 56 and the clock signal delivered by the frequency synthesis module 58 feed selection means consisting of a sequencer 62 intended to produce signals which make it possible to tag within the frame of the signal from the STM16 the various signals to be processed.

The sequencer 62 consists of a set of counters synchronized by the frame synchronization pulse so that the STM16 signal frame formed is in phase with the frame of the input signal.

The counters divide the clock of the incident signal so as to obtain a periodicity of one frame. Any binary element of the frame can then be tagged by simple decoding of the value of the counter with the aid of logic elements.

By virtue of the high value of the STM16 signal frequency, the processing operations are not carried out serially at 2488.320 MHz, but in signal blocks allowing processing at a lesser frequency and the use of components from CMOS technology. In this FIG. 7, processing is carried out over 32 bits.

The sequencer 62 therefore effects a first division by 32, then by 4, 9, 30 and 9 so as to obtain a period of 125 microseconds.

It decodes the following signals:

TOP B1: position of byte B1 in the frame of the signal from the STM16;

Env B1: set of bytes used for calculating the parity B1;

TOP B2 No. j: position of byte B2 No. j in the frame of the signal from the STM16;

Env B2 No. j: envelope of the bytes used for calculating the parity B2 No. j.

Among the 48 pairs of signals TOP B2, Env B2, three pairs of signals TOP B1 or TOP B2, Env B1 or Env B2 remain inactive. They are the ones which pertain to the columns of the AU4 selected. If the selected AU4 is number N, the three pairs may take the following values of j: N, N+16, N+32. This will allow the downstream module not to reinject the content of the byte B2, but to transfer that of the signal of the input STM1 and hence to let any possible error propagate.

The sequencer 62 moreover delivers a set of data selection signals, henceforth designated STM/MEMORY selection signals, feeding a set of multiplexing modules, such as 64, each connected to a memory, such as 66, with a view to effecting selective transfer to the output signal of on the one hand data from the digital input signal, and on the other hand data stored in the memories.

In particular, the decoder 62 delivers the following STM/MEMORY selection signals:

Selection signal STM1/MEMORY No. 1: this signal has the value 1 when a byte must take a value from the input signal and 0 when it takes a stored value.

It equals 1:

in columns 1, 17, 33, 49, 65, 81, 97, 113, 129 of the SOH of the STM1 except if the AU4 selected is No. 1, in rows 4, 5, 6, 7, 8, 9 and columns N, N+16, N+32, N+48, N+64, N+80, N+96, N+112, N+128 of the SOH if the AU4 selected is number N, for N equal to 1, 5, 9, 13, in columns N+16×K of the useful signal of the input signal, K taking values lying between 9 and 269 and N being equal to 1, 5, 9, 13.

Selection signal STM1/MEMORY No. 2: this signal has the value 1 when a byte must take a value from the input signal and 0 when it takes a stored value.

It equals 1:

in rows 4, 5, 6, 7, 8 and columns N, N+16, N+32, N+48, N+64, N+80, N+96, N+112, N+128 if the AU4 selected is number N, for N equals 2, 6, 10, 14, in columns N+16×K, where K takes values lying between 9 and 269 and N is equal to 2, 6, 10, 14.

Selection signal STM1/MEMORY No. 3: this signal has the value 1 when a byte must take a value from the input signal and 0 when it takes a stored value.

It equals 1:

in rows 4, 5, 6, 7, 8, 9 and columns N, N+16, N+32, N+48, N+64, N+80, N+96, N+112, N+128 if the AU4 selected is number N, for N equals 3, 7, 11, 15, in columns N+16×K, K taking values lying between 9 and 269 and N being equal to 3, 7, 11, 15.

Selection signal STM1/MEMORY No. 4: this signal has the value 1 when a byte must take a value from the input signal and 0 when it takes a stored value.

It equals 1:

in rows 4, 5, 6, 7, 8, 9 and columns N, N+16, N+32, N+48, N+64, N+80, N+96, N+112, N+128 if the AU4 selected is number N, for N equal to 4, 8, 12, 16, in columns N+16×K, K taking values lying between 9 and 269 and N being equal to 4, 8, 12, 16.

The sequencer 62 is embodied by an ASIC or an FPGA or may be integrated into one of these two types of components.

The signal delivered by each of the multiplexing modules 64 each feeds a calculation and byte B2 insertion module, such as 68, effecting calculation of the bytes B2 in accordance with recommendation ITU G709. When a signal TOP B2 is quiescent, the incoming data are transferred without modification to the output.

Each calculation module 68 can be embodied by an ASIC, an FPGA or be integrated into one of these two types of components.

Each of the signals delivered by the calculation modules 68 is next scrambled in accordance with recommendation ITU-T-G709 by means of a set of scrambling modules, such as 70, and then respectively feeds three contribution to the B1 parity calculation modules, such as 72, and a calculation and bytes B1 insertion module 74.

Each of the contribution to the B1 parity calculation modules 72 calculates the parity of all the bytes which are processed by these modules and count in the calculation of the B1 parity. It appends them to the parity transmitted by the module upstream and transmits the result to the downstream module.

The calculation and bytes B1 insertion module 74 calculates the parity of all the bytes which are processed by this module and count in the B1 calculation. It appends them to the parity transmitted by the upstream module and inserts the result into the downstream signal in the place indicated by the signal TOP B1. This module can be embodied as an ASIC, an FPGA or be integrated into one of these two types of components.

Into the signal delivered by the calculation and bytes B1 insertion module 74 is inserted the B1 error delivered by the calculation module 60 by means of a B1 error insertion module 76.

This B1 error insertion module 76 modifies the byte B1 previously calculated by multiplying this B1 error byte by an exclusive OR at the instant defined by the signal TOP B1. This block can be embodied as an ASIC, an FPGA or be integrated into one of these two types of components.

The signals delivered by each of the scrambling modules 70 and by the B1 error insertion module 76 are next multiplexed by a multiplexing module 78 then placed in series with the STM16 signal clock delivered by the frequency synthesis module 58 by means of a serializing module 80 which includes a logic serializing component and a laser diode emitter associated in a known marner with control and regulation circuits.

The serializing module 80 provides for the serializing of the bytes present at its inputs and if appropriate electrical/optical conversion of the signal. Moreover, when the signal loss signal is active, it cuts the sending of the signal delivered by the STM16.

The receive part of the information transmission device of the high bit rate digital path measuring apparatus will now be described with reference to FIG. 8.

As for the transmit part, the receive part includes a first timing extraction module 82 providing for reception of the input signal and if appropriate transformation of the signal into an electrical signal and supplies a LOS signal indicating the absence of incoming signal. It recovers the timing of the input signal, synchronizes with the frame, detects the errors in the bytes A1 and A2, parallelizes the input signal over 32 bits and divides the clock of the input signal by 8 and 32.

The frame synchronization pulse and the clock signal divided by 32 are presented as input to three counters, such as 84, respectively by 36, 30 and 9 so as to obtain a period of 125 microseconds. Each of the counters 84 feeds a data selection module 86 which, as for the transmit part, effects the decoding of the signals TOP B1, Env B1, TOP B2 No. j and Env B2 No. j as well as of signals SELECT and SAMPLE which define the byte of the signal of the incoming STM16 to be transferred to the output signal. When SAMPLE is 1, a byte is to be transferred, the number of this byte being coded over two bits with the aid of the signals SELECT.

To effect the implicit transfers of the data of the input signal, SAMPLE and SELECT designate:

in the SOH of the input signal: columns 1, 17, 33, 49, 65, 81, 97, 113, 129 apart from row 4, unless the selected row 4 is number 1, in the row of AU pointers: columns N, N+16, N+32, N+48, N+64, N+80, N+96, N+112, N+118, if the AU4 selected is number N, and in the payload: columns N+16×K, K taking values lying between 9 and 269.

The signals TOP B1 and Env B1 delivered by the data selection module 86 together with the input signal coded over 32 bits by the timing extraction module 82 are delivered to a B1 parity calculation module 88 providing for the calculation of the parity of all the bytes of the input signal which count in the calculation of the B1 parity. To do this, it uses the signal Env B1 which marks these bytes. It furthermore samples the byte B1 of the next frame and outputs a signal comparing between the sampled byte and the result of the parity calculation, which is valid over the duration of a frame.

Furthermore, the input signal coded over 32 bits and the signals TOP B2 and Env B2 delivered by the data selection module 86 are supplied to a set of B2 parity calculation modules 90.

Each of the B2 parity calculation modules 90 provides for the detection of the B2 errors by calculating the B2 parity over the columns of the input signal. It is appreciated that for a B2 byte No. j, the envelope signal Env B2 No. j specifies the bytes entering the calculation, the signal TOP B2 No. j specifying the byte which is sampled.

The output signal from each of these modules is a signal in the form of bytes having the value "1" during a frame in the erroneous bit.

As for the transmit part, the calculation is carried out in accordance with recommendation ITU-T-G709. The output signals from the B2 parity calculation modules 90 are next added together by means of adders such as 92 which effect an OR between the error bytes emanating from the various calculation modules 90 and which supply a signal in the form of bytes having a value 1 during a frame in one bit, if at least one of the 16 incoming bits is equal to 1.

Furthermore, the input signal coded over 32 bits is supplied to a sampling module 94 and to a byte selection module 96 which, by means of the signals SAMPLE and SELECT, effects selection of one byte from sixteen consecutive bytes of the input signal presented per word of 32 successive bits, the selected byte furthermore being resynchronized to the timing of the output signal.

The output signal from each of these modules 94 and 96 for sampling and selecting the bytes is delivered to B2 parity calculation modules, such as 98, which each deliver a B2 parity calculation signal in the STM1 signal thus reformed, to a corresponding B2 error insertion module 100.

Each B2 error insertion module 100 is furthermore connected to a corresponding B2 parity calculation module 90 and carries out an exclusive OR between the calculated B2 parity byte and the transmitted B2error byte.

The signal delivered by the sampling and selection modules 94 and 96 together with the signals delivered by the B2 error insertion modules 100 are delivered to a multiplexing module 102 which sets any possible erroneous bytes B2 in the signal from the STM1.

The output signal from this multiplexer 102 is next scrambled by means of a scrambling module 104 and then presented as input to a B1 parity calculation module 106 which calculates, in a manner identical to the transmit part of the measuring device, the B1 parity byte in the reformed STM1 signal.

A B1 error insertion module 108 next carries out an exclusive OR between the parity byte calculated by the B1 parity calculation module 106 and the B1 error byte originating from the input signal transmitted by the B1 error calculation module 88.

Any possible erroneous byte B1 is set in the signal from the STM1 by means of a B1 byte multiplexing module 110 and then an A1A2 error insertion module 112 carries out an exclusive OR between the last bit of the third A1 delivered by the timing extraction module 82 and the error signal supplied by the multiplexing module 110.

Finally, the signal delivered in the STM1 module is formed by means of a serializing and coding module 114 fed on the one hand with the signal delivered by the A1A2 error insertion module 112 and, on the other hand, with the clock signal of the signal from the STM16 divided by 8 and the signal loss alarm signal (LOS).

This module serializes the signal from the STM1 and codes it by CMI. It furthermore cuts transmission of the output signal when the signal loss signal has the value 1.

It should be noted that various modules entering into the construction of this high bit rate digital signal reception stage can be embodied by means of components identical to those used for the transmission stage, as an ASIC, an FPGA or as a component integrated into one of these two types of components.

I claim:

1. A device for transferring information between a first generator of digital data signals and a second generator of digital data signals of a signal transmission module, comprising:
    a selecting means for selecting first and second characteristics of a digital input signal containing the information, said selecting means authorizing elements of the digital input signal containing the first characteristics for direct transfer to a digital output signal;
    a direct transmission means for direct transmission of the information from the digital input signal to the digital output signal;
    a positioning means for positioning within the first characteristics of the digital output signal the elements of the first characteristics authorized by said selecting means so that a variation in the first characteristics of the input signal gives rise to an identical variation in the first characteristics of the digital output signal;
    a measuring means for measuring the second characteristics of the digital input signal selected by said selecting means;
    an output signal modification means connected to said measuring means,
    said output signal modification means being designed and constructed to modify the digital output signal based on values of the second characteristics supplied by said measuring means so that the second characteristics of the digital output signal and the digital input signal are identical.

2. The device of claim 1, wherein the digital input signal is a framed signal, and further comprises a timing extraction means for extracting an input signal timing;
    said selecting means comprising a set of counters synchronized to the digital input signal designed and constructed to effect a division of the input signal timing to obtain a frame of the digital input signal; and
    a decoding means to detect the data of the frame.

3. The device of claim 1, wherein said means of direct transmission comprises means for sampling the elements of the digital input signal containing the first characteristics authorized by said selecting means for direct transfer to the digital output signal.

4. The device of claim 1, wherein said positioning means and said output signal modification means comprise multiplexing means for multiplexing elements of the digital input signal with the digital output signal, the digital output signal comprising signals originating from said selecting means.

5. The device of claim 1, wherein said measuring means of the second characteristics of the digital input signal comprises calculating means for calculating the second characteristics on the basis of elements of the input signal originating from said selecting means.

6. The device of claim 1, wherein said selecting means, said means of direct transmission, said modification means, and said positioning means comprise logic components selected from the group consisting of ECL technology, ECL/CMOS converters, and timing recovery modules based on surface-wave filters.

7. The device of claim 2, further comprising a generator of high bit rate digital data signals from low bit rate digital data signals, said generator comprising a frequency multiplication means connected to said timing extraction means and to said modification means, said frequency multiplication means receiving a signal from said timing extraction means and producing a clock signal for the high bit rate digital data signal.

8. The device of claim 7, wherein said generator further comprises a data storage means connected to said direct transmission means and to said selecting means, said generator being designed and constructed to selectively transfer data of the low bit rate digital data signal and of data stored in said data storage means to the high bit rate digital data signal.

9. The device of claim 7, wherein the second characteristics of the low bit rate digital data signal consist of data comprising one of an error in a frame alignment word and an error in an error monitoring word of a regenerated elementary section of the low bit rate signal.

10. The device of claim 2, further comprising a generator of low bit rate digital data signals from high bit rate digital data signals, said generator comprising a frequency division means connected to said timing extraction means and to said modification means, said frequency multiplication means receiving a signal from said timing extraction means and producing a clock signal for a low bit rate digital data signal from the signal delivered by said timing extraction means.

11. The device of claim 10, wherein the second characteristics of the high bit rate digital data signal consist of data comprising one of an error in a frame alignment word, an error in an error monitoring word of a regenerated elementary section of the low bit rate signal, and an error monitoring word of a multiplex section of the high bit rate digital data signal.

* * * * *